United States Patent [19]

Yoshino

[11] Patent Number: 5,043,898
[45] Date of Patent: Aug. 27, 1991

[54] ANTILOCK BRAKE CONTROL DEVICE

[75] Inventor: Masato Yoshino, Itami, Japan

[73] Assignee: Sumitomo Electric Industries, Ltd., Osaka, Japan

[21] Appl. No.: 440,372

[22] Filed: Nov. 22, 1989

[51] Int. Cl.$^5$ .............................................. B60T 8/84
[52] U.S. Cl. .................. 364/426.02; 303/95; 303/96; 303/103; 180/197
[58] Field of Search ............ 364/426.02, 426.03; 180/197; 303/95–96, 98, 102, 103

[56] References Cited

U.S. PATENT DOCUMENTS

| | | | |
|---|---|---|---|
| 4,823,269 | 4/1989 | Fujioka et al. | 364/426.03 |
| 4,835,695 | 5/1989 | Walenty et al. | 364/426.02 |
| 4,873,638 | 10/1989 | Shiraishi et al. | 364/426.01 |
| 4,873,639 | 10/1989 | Sato et al. | 364/426.02 |
| 4,943,922 | 7/1990 | Tanaka | 364/426.02 |

Primary Examiner—Thomas G. Black
Attorney, Agent, or Firm—Wenderoth, Lind & Ponack

[57] ABSTRACT

An antilock brake control device controls the brake pressure of first and second rear wheels in accordance with one of a select-low mode and an independent mode. The select-low mode is carried out when the sum of the slip rates of the first and second rear wheels exceeds a predetermined value, and the independent mode is carried out when the sum of the slip rates of the first and second rear wheels is less than the predetermined value. In the select-low mode, control of the brake pressure applied to the first and second rear wheels is carried out in accordance with the rotation of the one of the first and second rear wheels having the slower wheel speed. In the independent mode, the braking control of each of the first and second rear wheels is independently carried out in accordance with the rotation of the first and second rear wheels, respectively.

3 Claims, 6 Drawing Sheets

ANTILOCK BRAKE CONTROL DEVICE

BACKGROUND OF THE INVENTION

The present invention relates to an antilock brake control device for efficiently braking the wheels of an automobile, particularly the rear wheels of the automobile.

In order to brake the wheels of an automobile with maximum efficiency, the braking pressure must be controlled so as to follow changes in the coefficient of friction between the road surface and the wheels. For this purpose the brake assembly should be provided with an antilock device which is adapted to increase, hold and reduce the braking pressure so as to repeatedly and alternately release and apply the brake at very short time intervals even while the brake pedal is being trodden.

Such an antilock control device includes wheel speed sensors for detecting the rotation of the wheels, an electronic control circuit for calculating the wheel speeds, estimated vehicle speed (reference wheel speed) and slip rates and for producing control signals. Such control signals include pressure signals, such as pressure reduction, pressure hold and pressure increase signals, to be applied to a fluid pressure control unit which controls the braking pressure generated in a master cylinder and applied to the wheel cylinder.

More specifically, the electronic control circuit performs various arithmetic operations based upon the wheel rotation signals to determine the slip rate and deceleration, judges from the fluctuation of the slip rates and deceleration whether each wheel is falling into a locked state or recovering from the locked state, and provides control signals such as pressure reduction, pressure hold and pressure increase signals on the basis of this judgement.

A typical prior art fluid pressure control unit includes solenoid valves (optionally provided with cutoff valves or flow control valves), check valves, hydraulic pumps with motors, accumulators and reservoir tanks. The valves of one of the abovementioned types are provided in the brake pressure lines between the master cylinder and the respective wheel cylinders to control the flow of braking pressure or pump pressure.

As a method for controlling the flow of braking pressure to the wheel cylinders, it is known to provide one control unit for each vehicle wheel to control the wheels independently of one another (four-channel mode), to provide one control unit for each of the right and left front wheels and one for both rear wheels (three-channel mode), and to provide one control unit for each of the right and left front wheels and adapt the system so that the hydraulic pressure acting on each of the rear wheels follows the hydraulic pressure acting on one of the front wheels (2-channel mode).

As a method of providing fluid pressure control signals to the above-described hydraulic circuit, it is known to control the two wheels at each side as one unit and reduce the braking pressure on all the wheels if the wheels at one side, which are controlled with a lower fluid pressure (which means that the coefficient of friction with the road surface is smaller), show a tendency to lock (such a control method is hereinafter referred to as the select-low mode). Another known method is to reduce the braking pressure on all the wheels if the wheels at one side, which are controlled with a higher fluid pressure, show a tendency to lock (select-high mode). It is also known to control the braking pressure on the wheels independently of one another according to the road condition (independent mode).

The select-low mode is effective in increasing the resistance of the wheels to lateral forces and thus in improving the directional stability and the drivability of the vehicle. However the select-low mode has a problem in that the braking distance tends to be long because of an insufficient braking force. On the other hand, if the wheels are controlled in the select-high mode, the vehicle can be braked with a sufficient braking force, but its directional stability will be insufficient. With the independent mode, the wheels can be controlled individually so as to precisely conform to the changing road condition. In view of the advantages and disadvantages of each control mode, it is desirable to control the front wheels on the independent or select-high mode to assure a sufficient braking force and to control the rear wheels on the select-low mode to maintain a high directional stability.

However, with the abovementioned prior art antilock brake control devices, either all the wheels are always controlled independently of one another, or the rear wheels are always controlled in the select-low mode irrespective of the road condition.

Suppose now that the rear wheels are always controlled in the select-low mode. Since it is practically impossible to eliminate the manufacturing errors for the fluid pressure control unit, the braking pressures on right and left wheels can increase and decrease in different manners from each other, thus bringing about diferece in braking pressure between right and left wheels, in spite of the fact that the same control signals are provided to them. Even if the difference in pressure is small at first, it will gradually increase because the rear wheels are always controlled in the select-low mode. It will be appreciated from FIG. 7 that the distance between the curves b and a and the distance between the curve b' and a' increase with time (wherein the curves b and b' indicate the wheel speed and the braking pressure, respectively, if the pressures on both wheels are to increase and decrease in exact conformity with each other, whereas the curves a and a' indicate the actual wheel speed and the braking pressure, respectively). This means that the braking force on one of the rear wheels at the low pressure side is not effectively utilized.

With the independent control mode, where all the wheels are controlled independently of one another, if the difference in the coefficient of friction of the road surface between right and left sides of the vehicle is large and if the sum of slip rates of both rear wheels exceeds a predetermined value, the difference between the braking forces applied to both rear wheels will increase excessively. This will bring about a lag in the brake timing between both rear wheels and a difference in the pressure increase and pressure reduction intervals between both rear wheels as shown by curves c, c', d and d' in FIG. 8, thus hampering the directional stability of the vehicle (the vehicle tends to lose its stability in the areas A and B). In such a case, the rear wheels should instead be controlled in the select-low mode in order to improve the directional stability .

However, it is not desirable to always control the rear wheels in the select-low mode. If the sum of slip rates of both rear wheels falls below a predetermined value, the difference between the braking forces applied to both rear wheels is so small as to not hamper the directional stability of the vehicle. Controlling the rear wheels on the select-low mode in such a situation would unnecessarily reduce the braking force on the rear wheels, thus increasing the braking distance.

SUMMARY OF THE INVENTION

It is an object of the present invention to provide an improved antilock brake control device which obviates the abovesaid shortcomings and which is capable of controlling the braking forces on the rear brakes of an automobile in an improved manner.

In accordance with the present invention, when the sum of slip rates of the rear wheels is above a predetermined value, the select-low mode is applied to the rear wheels. When this sum decreases below the predetermined value, the mode is switched from the select-low to the independent mode.

In other words, when the sum is larger than the predetermined value, both of the rear wheels are controlled simultaneously on the basis of the wheel speed information of the one of the rear wheels which is rotating at a lower speed, and when the sum is smaller than the predetermined value, all of the wheels are controlled independently of one another on the basis of the wheel speed information of the respective wheels.

By treading the brake pedal, the antilock control is activated. When the wheel speeds fall due to an increase in the braking pressure, the electronic control circuit calculates the slip rate and the deceleration for each wheel and the sum of the slip rates of both rear wheels, and judges whether or not the sum of the slip rates is larger than a predetermined value. If judged so, the wheel speeds of both rear wheels are compared with each other and the higher wheel speed is replaced with the slower wheel speed. The deceleration and the slip rate for each wheel are again calculated based upon the renewed wheel speeds to judge whether each wheel is showing a tendency to lock or recovering from the locked state. It is then determined based upon the above judgement which one of the pressure increase, pressure hold and pressure reduction signals is to be given. In other words, the rear wheels are controlled in the select-low mode.

If the sum of slip rates is smaller than the predetermined value, the wheels are controlled not on the select-low mode, but are instead controlled independently of one another. Namely, the input signals for each wheel are used to control the wheels independently.

DESCRIPTION OF THE DRAWINGS

Other features and objects of the present invention will become apparent from the following description taken with reference to the accompanying drawings, in which.

DETAILED DESCRIPTION OF THE PRESENT INVENTION

Figure 1:
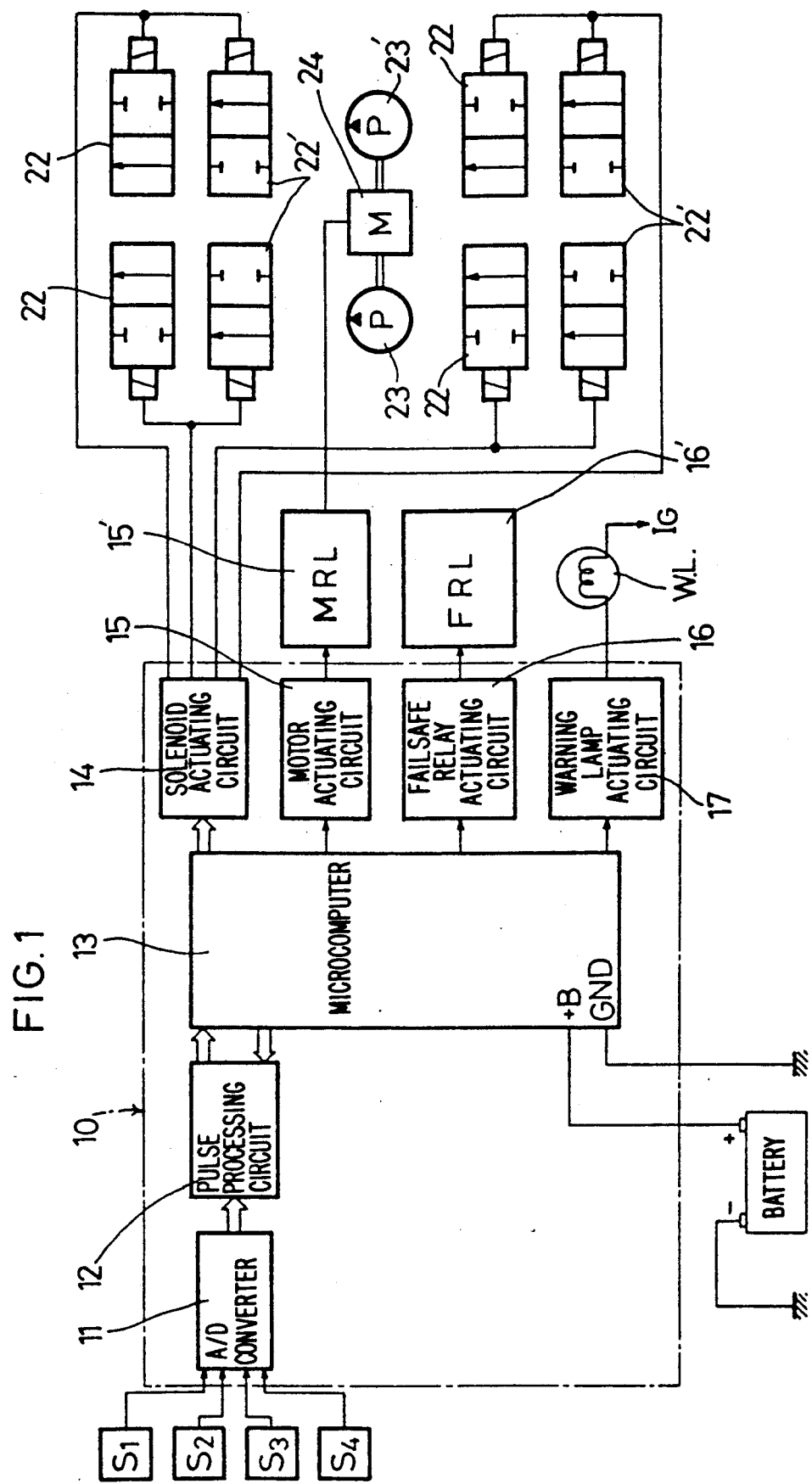
FIG. 1 is a block diagram of the electronic control circuit in the antilock brake control device embodying the present invention.

As shown in FIG. 1, wheel rotation signals detected by wheel rotation sensors S1 to S4 are fed to an A/D converter 11 to be converted into pulse signals, which are then processed in a pulse processing circuit 12 and fed to a microcomputer 13.

The microcomputer 13 calculates the deceleration, estimated vehicle speed, slip rates, etc. on the basis of the pulse signals which are representative of the wheel speeds of the respective wheels and outputs control signals based on a result of the above calculations to a solenoid actuating circuit 14 and a motor actuating circuit 15. The control signals from the microcomputer 13 are also fed to a failsafe relay actuating circuit 16 and a warning lamp actuating circuit 17. W.L denotes a warning lamp.

The solenoid actuating circuit 14 feeds four separate control signals to four pairs of solenoid valves 22 and 22' (two-position changeover valves) to turn ON or OFF the respective pairs of valves independently of one another and thus to increase, maintain or reduce the braking pressure on the brake cylinder for each vehicle wheel.

Figure 2:
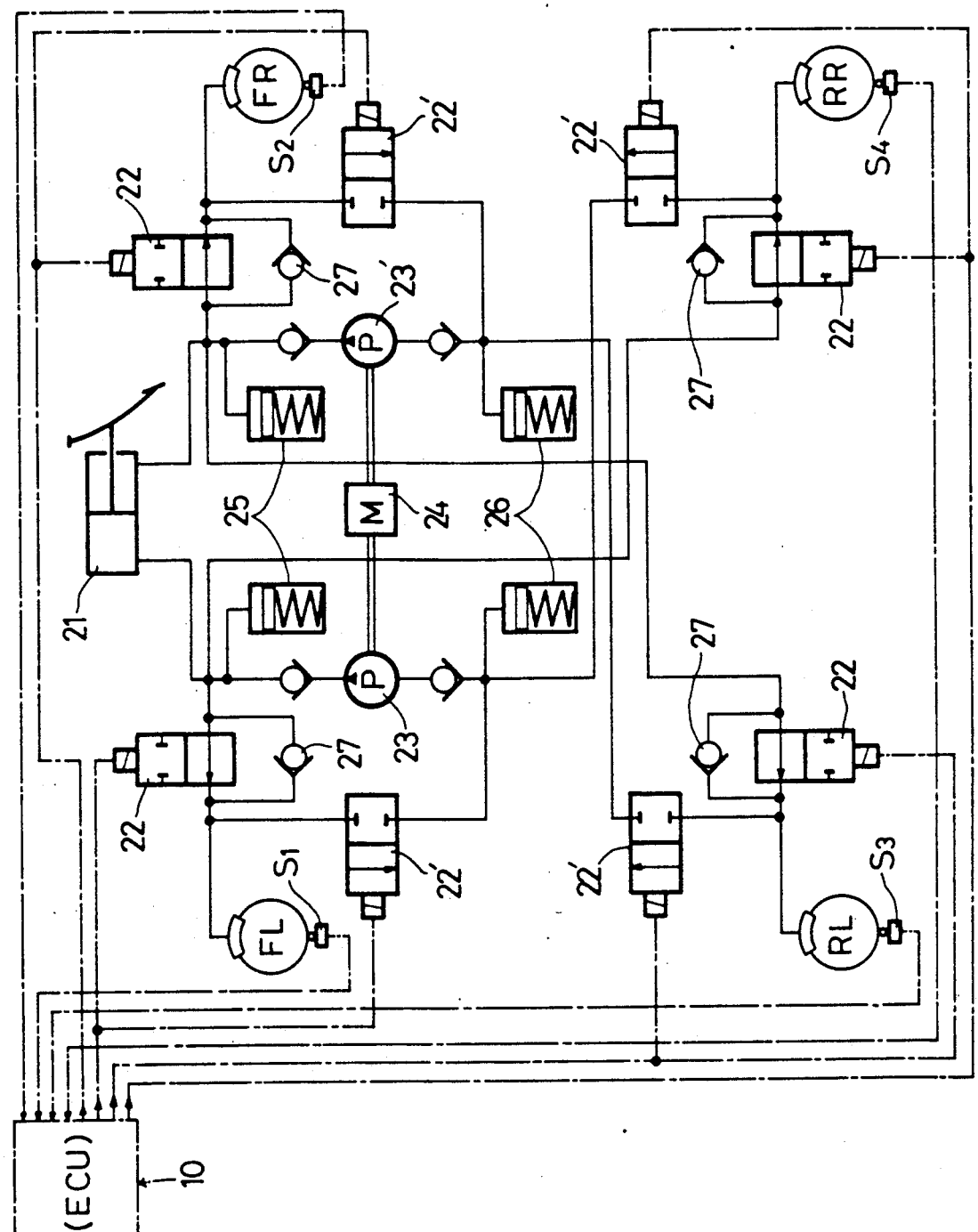
FIG. 2 is a block diagram of the hydraulic circuit of the same.

As shown in FIG. 2, the hydraulic circuit in this embodiment includes a master cylinder 21, the solenoid valves 22 and 22' (the former being provided in the braking pressure circuit and the latter in the return line), hydraulic pumps 23, a motor 24, accumulators 25, reservoir tanks 26 and check valves 27. The braking pressure generated in the master cylinder 21 is transmitted through two lines to the right and left front wheels and then to the left and right rear wheels through lines crossing each other in an X shape. One pair of solenoid valves 22 and 22' and one check valve 27 are provided for each wheel. The hydraulic pumps 23, accumulators 25 and reservoir tanks 26 are each provide in the respective brake lines at both sides of the hydraulic circuit. The hydraulic pumps 23 are driven by a single dual-shaft type drive motor 24. This type of hydraulic circuit is called a circulating type circuit.

FIGS. 3 to 8 show how the antilock brake control device according to the present invention operates. When the vehicle starts, the signals representative of the individual wheel rotations are fed into the electronic control unit 10, and the microcomputer 13 calculates the wheel speeds $V_{FLH}$, $V_{FRH}$, $V_{RLH}$ and $V_{RRH}$ of the respective wheels. The antilock control is activated upon treading the brake pedal.

Figure 3:
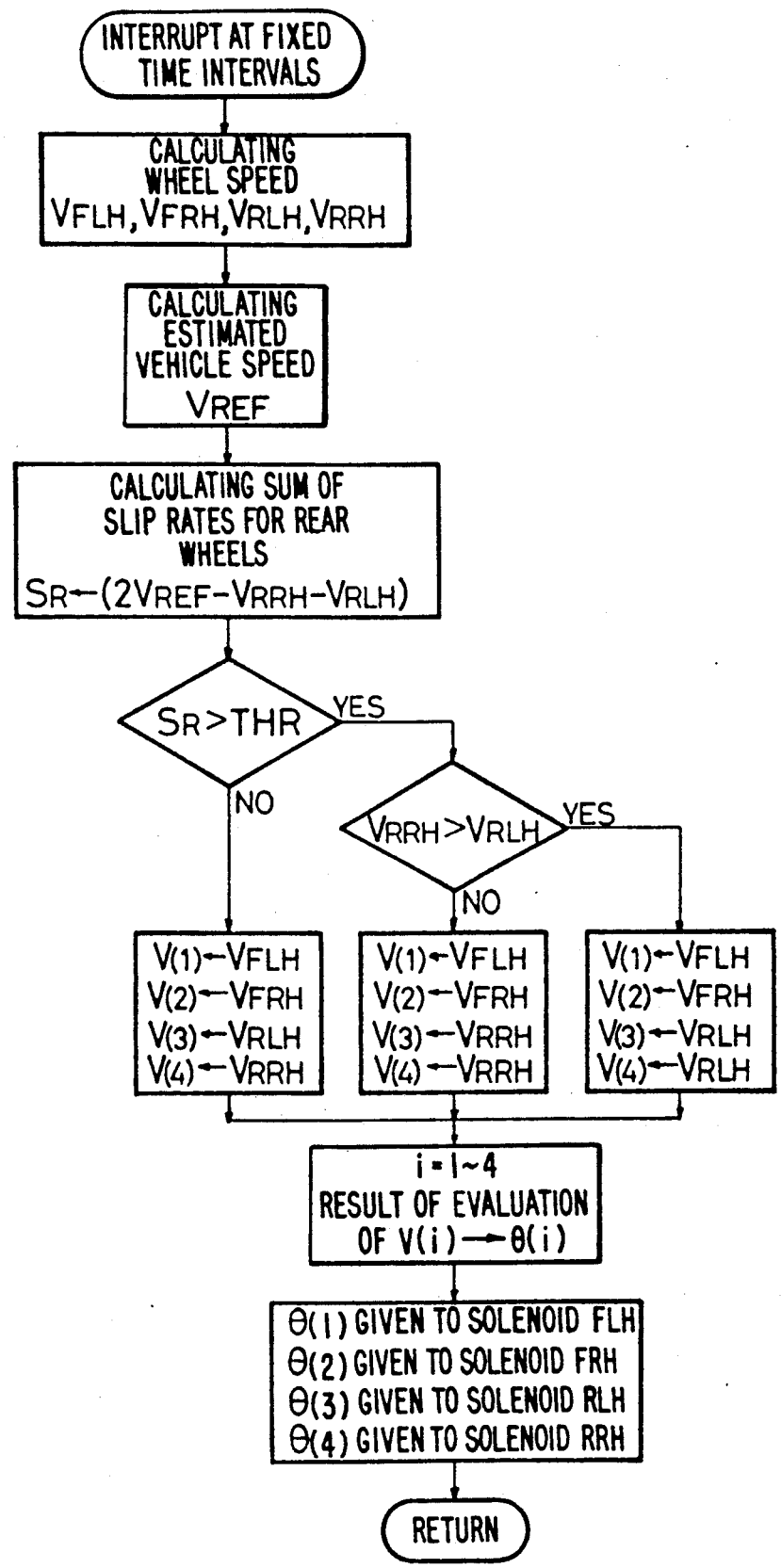
FIG. 3 is a flow chart of the program stored in the electronic control circuit.

As shown in FIG. 3, upon application of the brake, the ECU will calculates the estimated vehicle speed VREF and the sum of the slip rates of the rear wheels $SR = (2V_{REF} - V_{RLH} - V_{RRH})$.

Next, a judgement is made as to whether or not the SR value is larger than a threshold value THR, which is such a value that if the SR value is larger than the threshold value THR, the stability of the vehicle is supposed to be influenced. In other words, if the SR value is smaller than the threshold value THR, the vehicle is judged to be travelling rather stably. Thus, the wheels are controlled independently of one another so as to follow the road condition, and the wheel speeds V(1)-V(4) detected are used as they are.

If the SR value is larger than the threshold value THR, the rear wheels are controlled on the select-low mode. Namely, the wheel speeds of both rear wheels are compared with each other and if the wheel speed $V_{RRH}$ of the right rear wheel turns out to be smaller than the wheel speed $V_{RLH}$ of the left rear wheel, the wheel speed $V_{RRH}$ is assigned to the wheel speed V(3) of the left rear wheel. If the right rear wheel is rotating at a higher speed, the wheel speed $V_{RLH}$ is assigned to the wheel speed V(4) of the right rear wheel. In other words, the rear wheels are controlled based upon the wheel speed information from the wheel rotating at a lower speed.

According to the surface condition of the road, one of the abovementioned three options is selected and the V(i) values (i=1-4) are determined accordingly. The deceleration Dv, slip rates S and the like are calculated on the basis of the thus renewed V(i) values to evaluate the V(i) values. The results of evaluation are given by $\theta(i)$. It is determined on the basis of the $\theta(i)$ values which of the pressure increase, pressure hold and pressure reduction signals is to be issued. This decision of the control signal may be made in accordance with the flow chart for ordinary antilock control shown in FIG. 4.

Before entering the operation of flow chart in FIG. 4, initialization is executed in the main program (which is to be described later) and a control phase, which is a combination of pressure increase, pressure hold and pressure reduction commands, is set to Phase I. The control phase includes three phases, i.e. Phase I wherein the pressure increase command is given continuously, Phase II wherein the pressure reduction and pressure hold commands are alternately given and Phase III wherein the pressure increase and pressure hold commands are alternately given.

Figure 4:
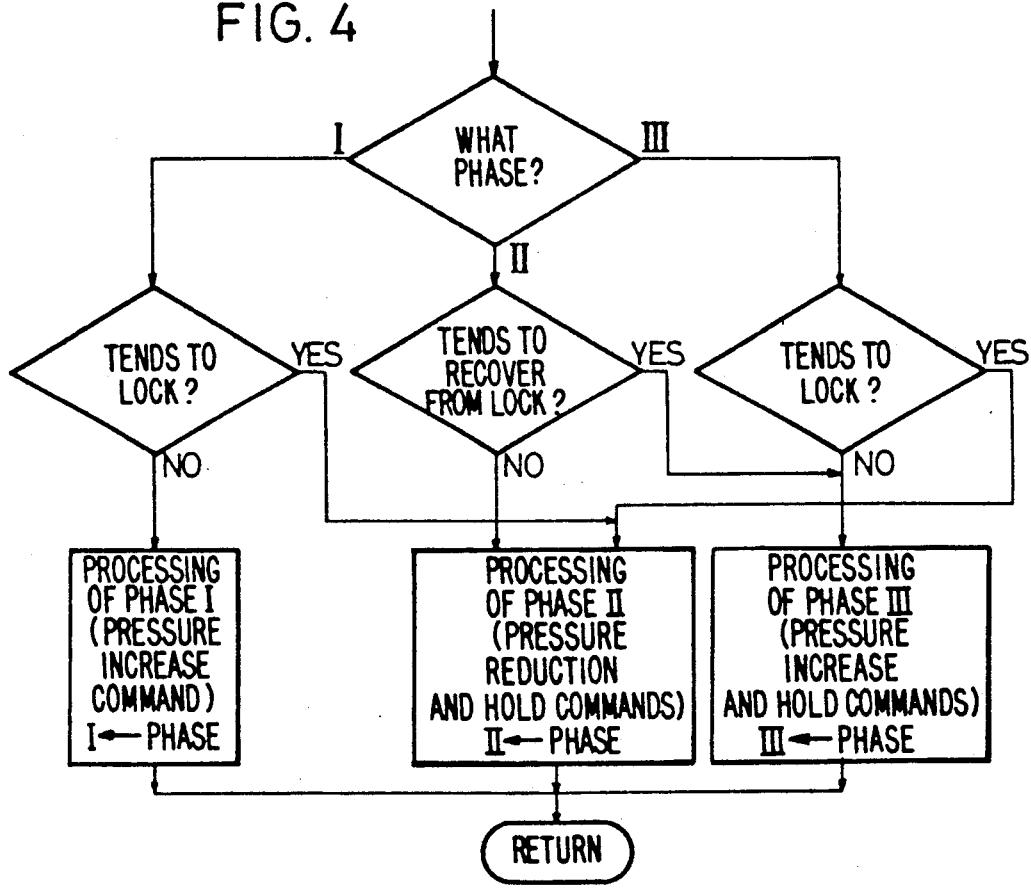
FIG. 4 is a flow chart of a portion of an ordinary antilock control program.

With the control phase is set to Phase I, the routine shown by the flow chart of FIG. 4 is executed. If the deceleration and slip rates calculated from the V(i) values (i=1 to 4) do not indicate any locking tendency of the wheels, the control signal for Phase I is applied to the solenoids for the respective wheels. While this routine is repeated with the control phase maintained at Phase I, i.e. with the braking pressure on the wheels continuously increasing, the deceleration and the slip rates will change until the wheels fall into a locked state.

If the locking tendency of the wheels is detected, the control phase will switch from Phase I to Phase II in which the pressure reduction and pressure hold commands are alternately given to reduce the braking pressure and allow the wheels to recover from the locked state. When the wheels are found to be recovering from the locked state, the control phase will switch from Phase II to Phase III. As far as the surface condition of the road remains substantially unchanged, the control phase will switch from Phase I to Phase II and then to Phase III because in this manner the vehicle can be braked with the highest efficiency and can be slowed down or stopped quickly. However, if the coefficient of friction between the road surface and the wheels should change drastically, the control phase is adapted to switch from Phase III to Phase II and then back to Phase III.

Figure 5:
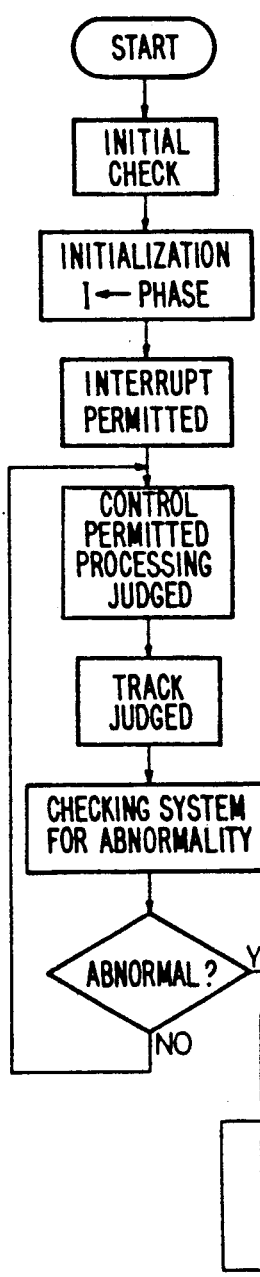
FIG. 5 is a flow chart of the main program.

FIG. 5 shows an example of the main program in the microcomputer 13. The sub-programs shown by the flow charts in FIGS. 3 and 4 are adapted to interrupt the main program at regular time intervals. In the main program, after initial check and initialization steps have been executed, the control phase is set to Phase I and an interrupt permission is provided. The following non-emergent judgement steps are repeated indefinitely as long as no abnormal state is detected and thus constitute an infinite loop. The sub-programs are executed at uniform time intervals while temporarily interrupting the main program.

Figure 6:
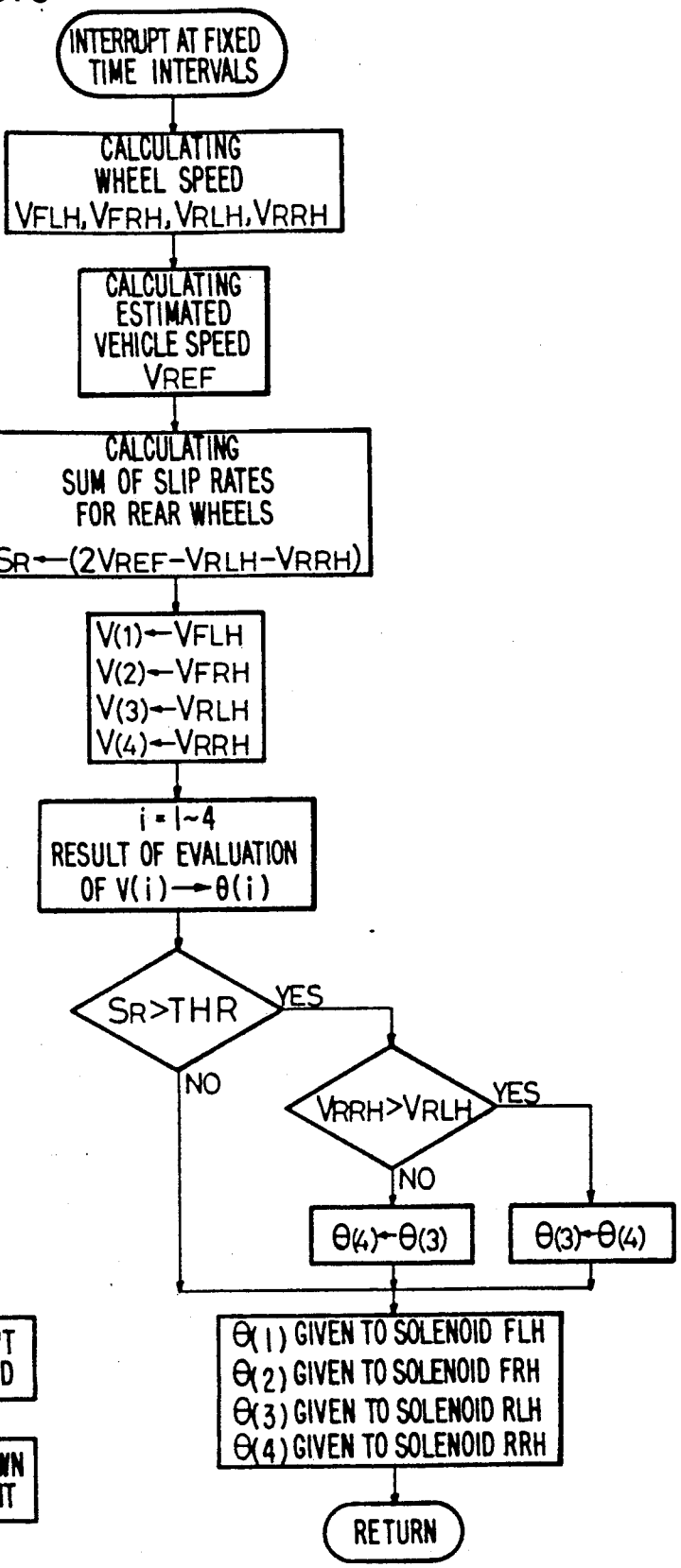
FIG. 6 is a flow chart of another example of the program of FIG. 3.
Figure 7:
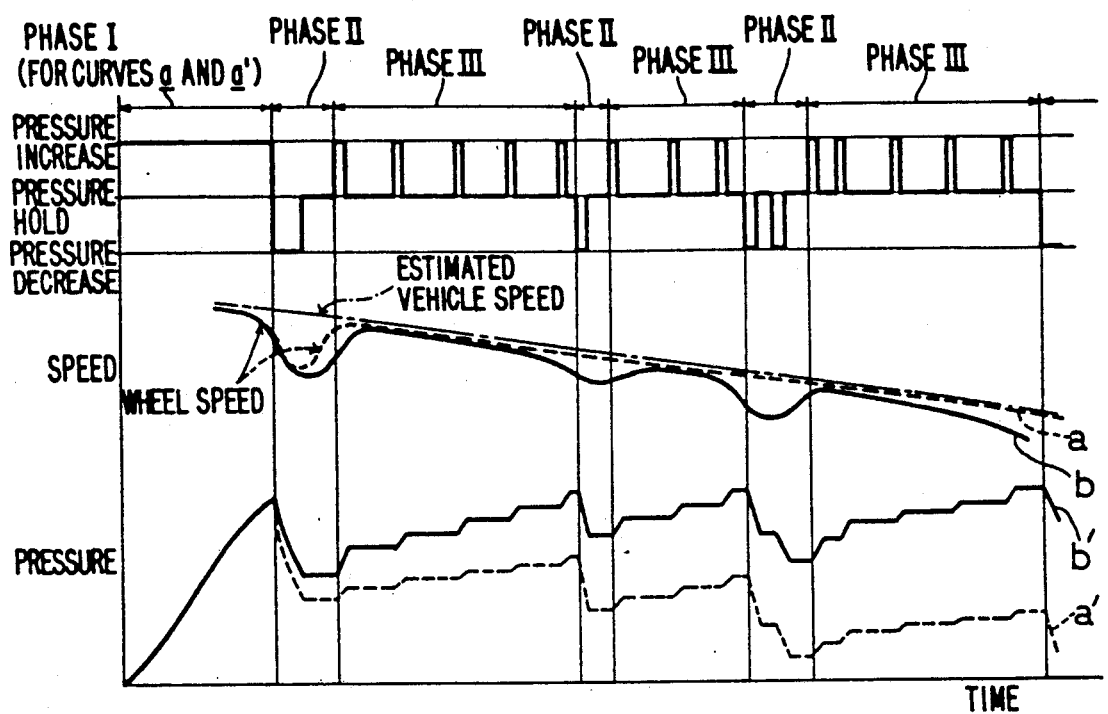
FIG. 7 and 8 are graphs showing how a prior art antilock control device operates.
Figure 8:
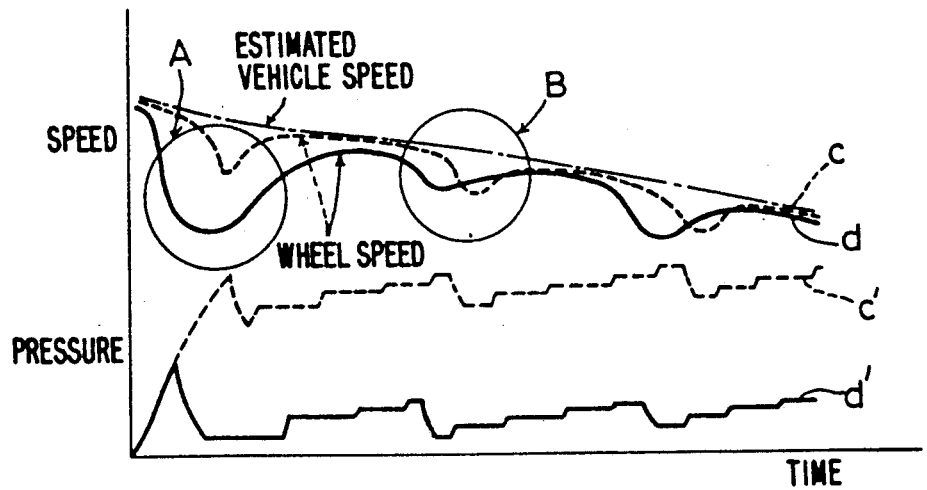

A program shown in FIG. 6 is substantially the same as the sub-program shown in FIG. 3 with the exception that the V(i) values (i=1 to 4) are evaluated at an earlier stage. If the wheels are to be controlled on the select-low principle, the results of evaluation $\theta(i)$ (i=1 to 4) including the deceleration and the slip rates are all replaced with the results of evaluation for the low-speed side.

What is claimed is:

1. An antilock brake control device comprising:
   first and second wheel sensor means for respectively detecting a rotation of first and second rear wheels of a vehicle and for outputting corresponding first and second wheel rotation signals;
   control means for (a) calculating, in accordance with the first and second wheel rotation signals, first and second wheel speeds of the respective first and second rear wheels, a speed and deceleration of the vehicle, and first and second slip rates of the respective first and second rear wheels, and (2) outputting, in accordance with one of a select-low mode and an independent mode, first and second fluid pressure control signals, and,
   fluid pressure control means for independently actuating a braking force applied to each of the first and second rear wheels in accordance with the first and second fluid pressure control signals, respectively;
   wherein, in the select-low mode, both of the first and second fluid pressure control signals are output based the detected rotation of a one of the first and second rear wheels having a lower wheel speed;
   wherein, in the independent mode, the first and second fluid pressure control signals are independently output based on the detected rotation of the first and second rear wheels, respectively;
   wherein said control means utilizes the select-low mode when a sum of the first and second slip rates exceeds a predetermined value, and utilizes the independent mode when the sum of the first and second slip rates is less than the predetermined value.

2. A device as recited in claim 1, wherein said control means further includes:
   means for replacing a calculated wheel speed of a one of the first and second rear wheels having a higher wheel speed with the calculated wheel speed of the other of the first and second rear wheels when the sum of the slip rates exceeds the predetermined value, and
   means for then calculating renewed first and second slip rates and vehicle deceleration based on the replaced wheel speed of the one of the first and second rear wheels and the calculated wheel speed of the other of the first and second rear wheels.

3. A device as recited in claim 1, wherein said control means further includes:
   means for replacing a calculated wheel speed and slip rate of a one of the first and second rear wheels having a higher wheel speed with the calculated wheel speed and slip rate of the other of the first and second rear wheels when the sum of the slip rates exceeds the predetermined value.

* * * * *